US012789350B2

(12) United States Patent
Howard

(10) Patent No.: US 12,789,350 B2
(45) Date of Patent: Nov. 10, 2026

(54) TELESCOPING POOL TOOL

(71) Applicant: Kenneth M. Howard, Solana Beach, CA (US)

(72) Inventor: Kenneth M. Howard, Solana Beach, CA (US)

( * ) Notice: Subject to any disclaimer, the term of this patent is extended or adjusted under 35 U.S.C. 154(b) by 0 days.

(21) Appl. No.: 18/519,809

(22) Filed: Nov. 27, 2023

(65) Prior Publication Data

US 2024/0181622 A1 Jun. 6, 2024

Related U.S. Application Data

(63) Continuation of application No. 17/157,569, filed on Jan. 25, 2021, now Pat. No. 11,845,175.

(60) Provisional application No. 63/093,510, filed on Oct. 19, 2020, provisional application No. 62/965,454, filed on Jan. 24, 2020.

(51) Int. Cl.
*B25G 1/04* (2006.01)
*E04H 4/16* (2006.01)

(52) U.S. Cl.
CPC ................. *B25G 1/04* (2013.01); *E04H 4/16* (2013.01); *E04H 4/1636* (2013.01)

(58) Field of Classification Search
CPC ............ E04H 4/16; E04H 4/1636; B25G 1/04
See application file for complete search history.

(56) References Cited

U.S. PATENT DOCUMENTS

| | | | | |
|---|---|---|---|---|
| 6,223,358 | B1 * | 5/2001 | DePietro | E04H 4/108 248/161 |
| 6,989,093 | B1 * | 1/2006 | Greathead | E04H 4/1254 210/232 |
| 10,945,381 | B1 * | 3/2021 | Pringnitz | B25G 1/04 |
| 2015/0050162 | A1 * | 2/2015 | Acklin | E04H 4/16 417/313 |
| 2019/0128446 | A1 * | 5/2019 | Harms | E04H 4/1609 |
| 2020/0240164 | A1 * | 7/2020 | Capps | E04H 4/14 |
| 2021/0047123 | A1 * | 2/2021 | Eickmann | B27B 17/00 |
| 2021/0062528 | A1 * | 3/2021 | Newville | B25G 1/04 |
| 2021/0299846 | A1 * | 9/2021 | Chen | A46B 5/005 |

* cited by examiner

*Primary Examiner* — Michael D Jennings
(74) *Attorney, Agent, or Firm* — Intellectual Property Consulting, LLC; Mark N. Melasky; Jared Rovira

(57) ABSTRACT

A quick draining pool tool is provided. A base tube has a distal end opposite a proximal end and is operable to receive and secure a tool. A drain is defined by the base tube. A first stage tube has a distal end opposite a proximal end and is connected to the base tube. One or more secondary stage tubes are operable to be disposed within the first stage tube. The one or more said secondary stage tubes are operable to telescopically extend from the distal end of the first stage tube. A grip is disposed at the distal end of the secondary stage tubes and defines a vent operable to enable rapid draining of the pool tool. An interior flow path is defined by the base tube, the first stage tube, and the one or more secondary stage tubes.

29 Claims, 10 Drawing Sheets

TELESCOPING POOL TOOL

CROSS REFERENCE TO RELATED APPLICATIONS

This application is a continuation of U.S. patent application Ser. No. 17/157,569, filed Jan. 25, 2021, which claims priority to U.S. Provisional Patent Application No. 62/965,454, filed Jan. 24, 2020, and U.S. Provisional Patent Application No. 63/093,510, filed Oct. 19, 2020, the entirety of which are incorporated by reference herein as if it fully disclosed herein.

BACKGROUND OF THE INVENTION

I. Field of the Invention

The present invention relates generally to pool cleaning tools.

II. General Background

Current pool poles are comparatively weak, unsubstantial, can be easily damaged, bent or crushed. They create drag, friction, and additional weight because water is trapped within the pole and not allowed to move freely in and out of the pole while in use. Current poles are designed with two small drain holes and a small or no air vent trapping excessive amounts of water in the pole which slowly drains out on your feet or the ground. Current locking mechanisms used to secure telescoping poles tend to get stuck making them very difficult to adjust or fail to maintain a secure hold on the pole letting the pole sections slip while in use.

BRIEF DESCRIPTION OF THE DRAWINGS

The foregoing and other objects, features, and advantages of the invention are apparent from the following detailed description taken in conjunction with the accompanying drawings in which like parts are given like reference numerals and, wherein.

Figure 1:
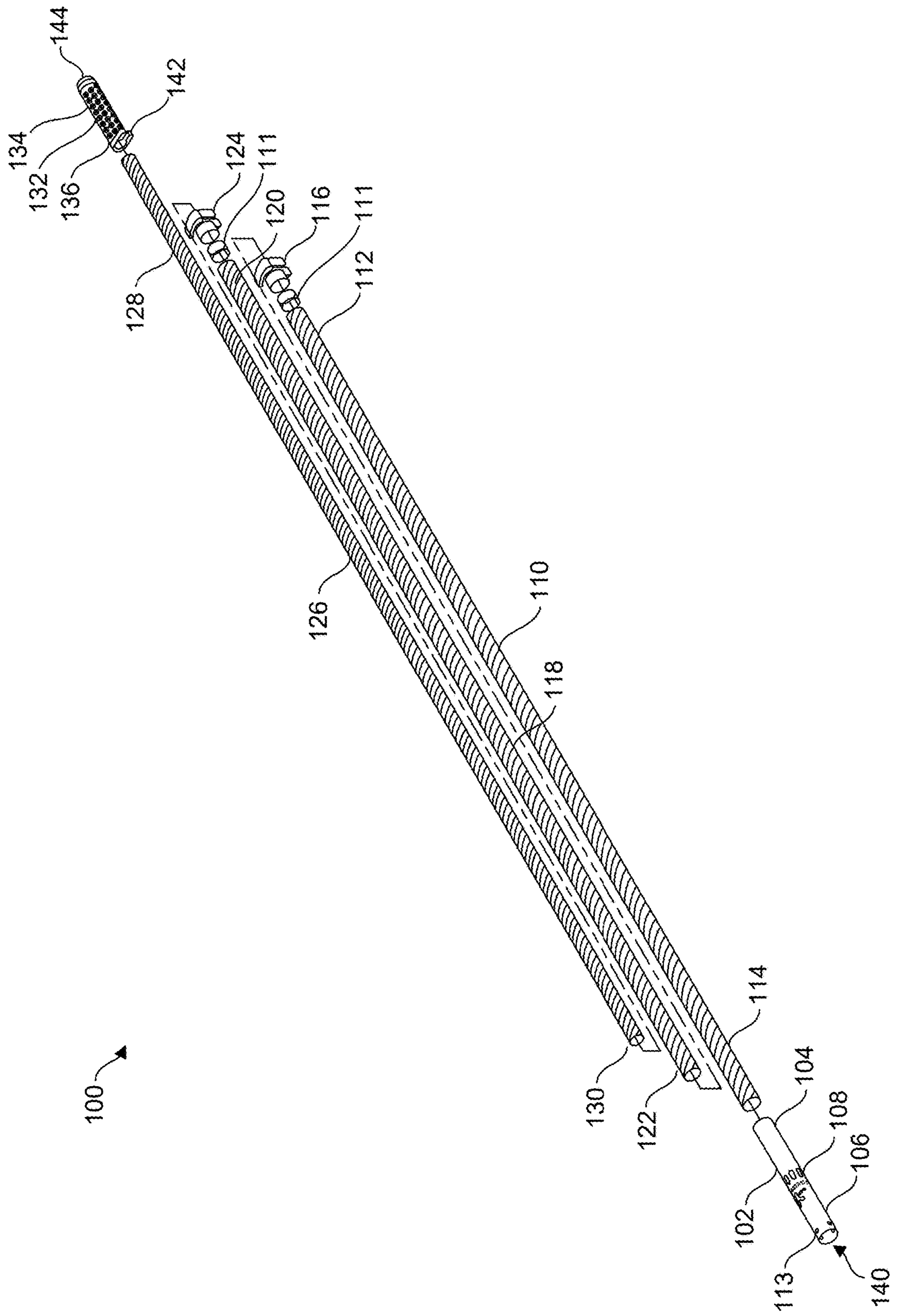
FIG. 1 illustrates an exploded perspective view of a pool tool in accordance with embodiments of the invention.
Figure 2:
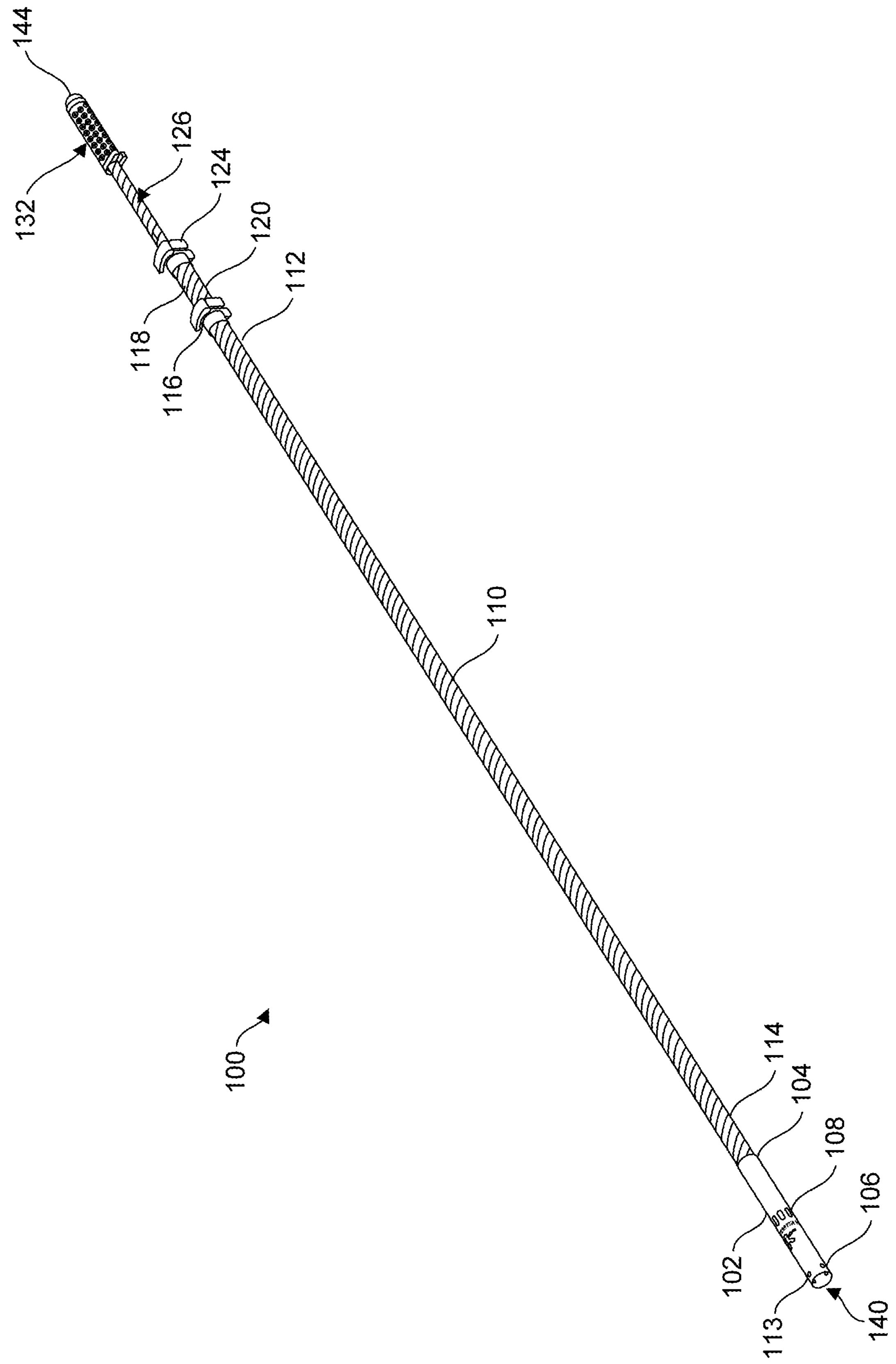
FIG. 2 illustrates a perspective view of an assembled pool tool in accordance with embodiments of the invention.
Figure 3:
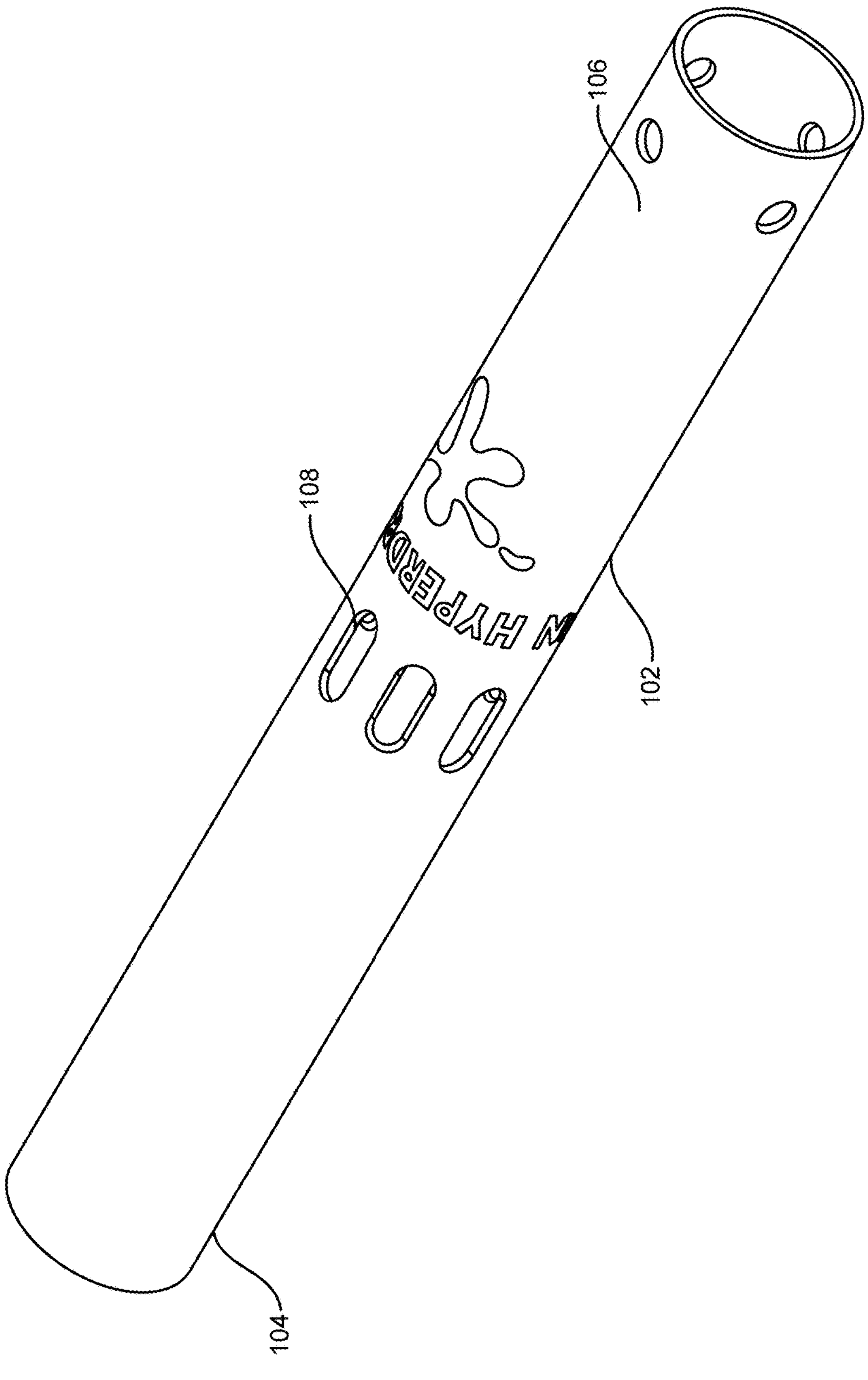
FIG. 3 illustrates a perspective view of a base tube in accordance with embodiments of the invention.
Figure 4:
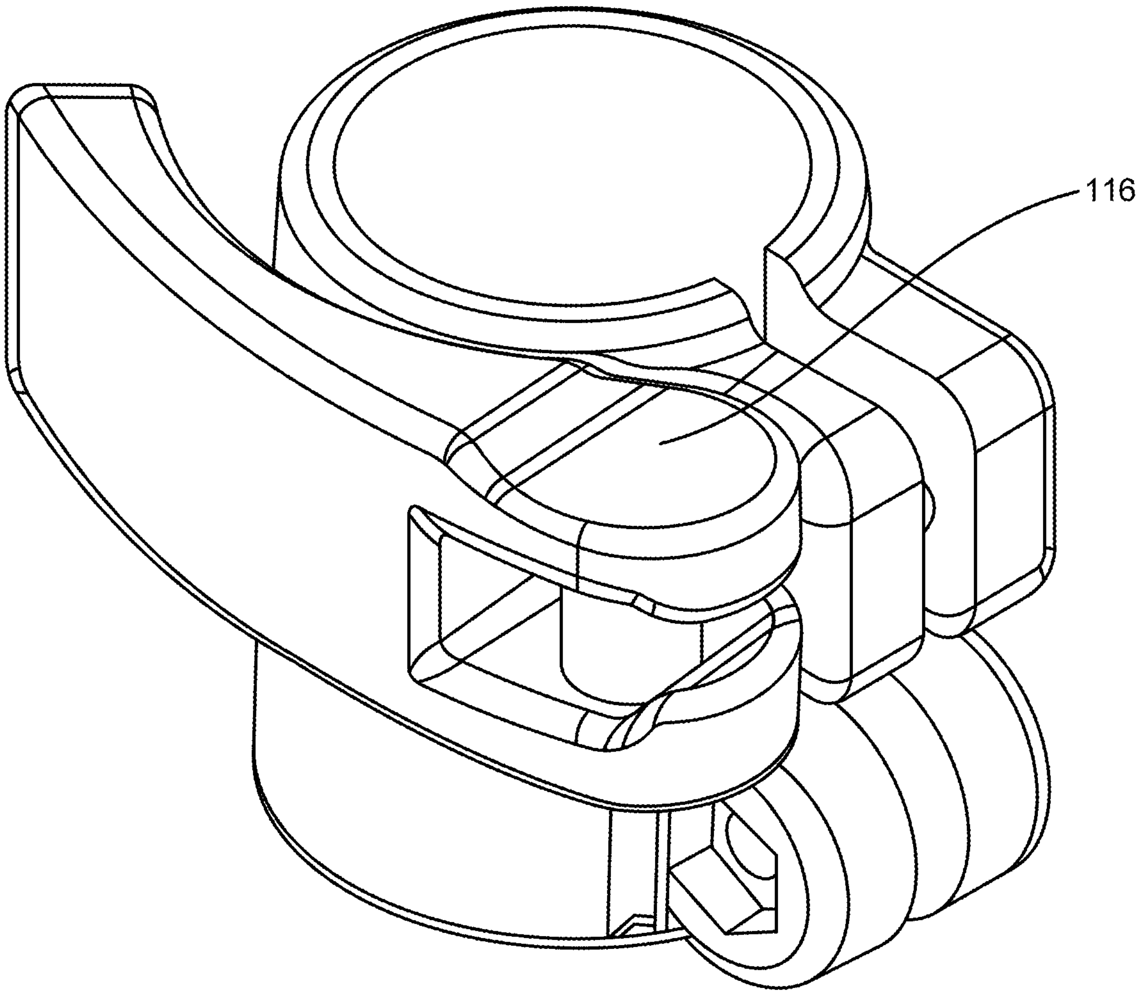
FIG. 4 illustrates a perspective view of a compression clamp in accordance with embodiments of the invention.
Figure 5:
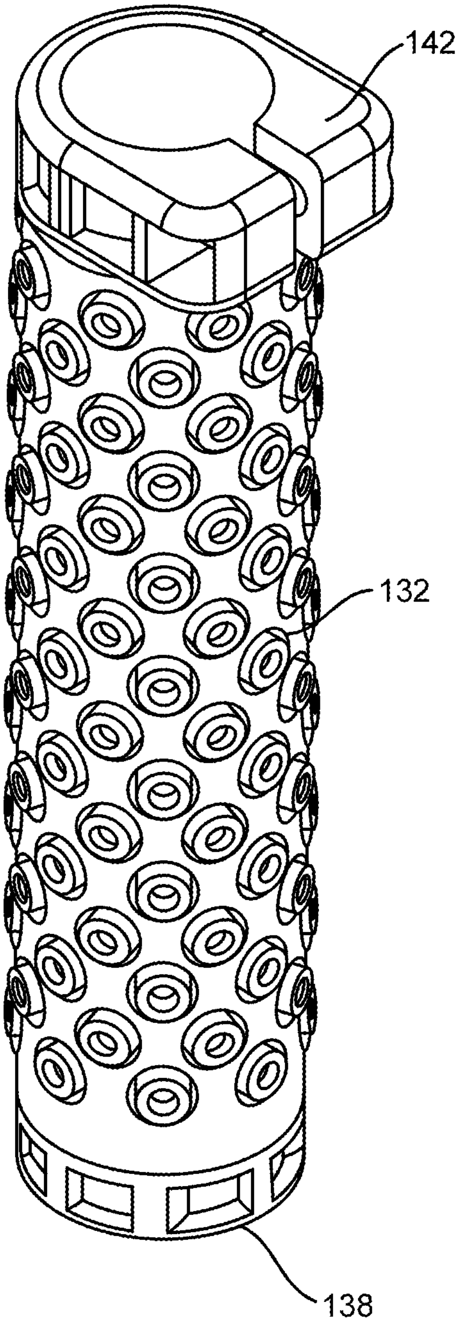
FIG. 5 illustrates a perspective view of a compression grip in accordance with embodiments of the invention.
Figure 6:
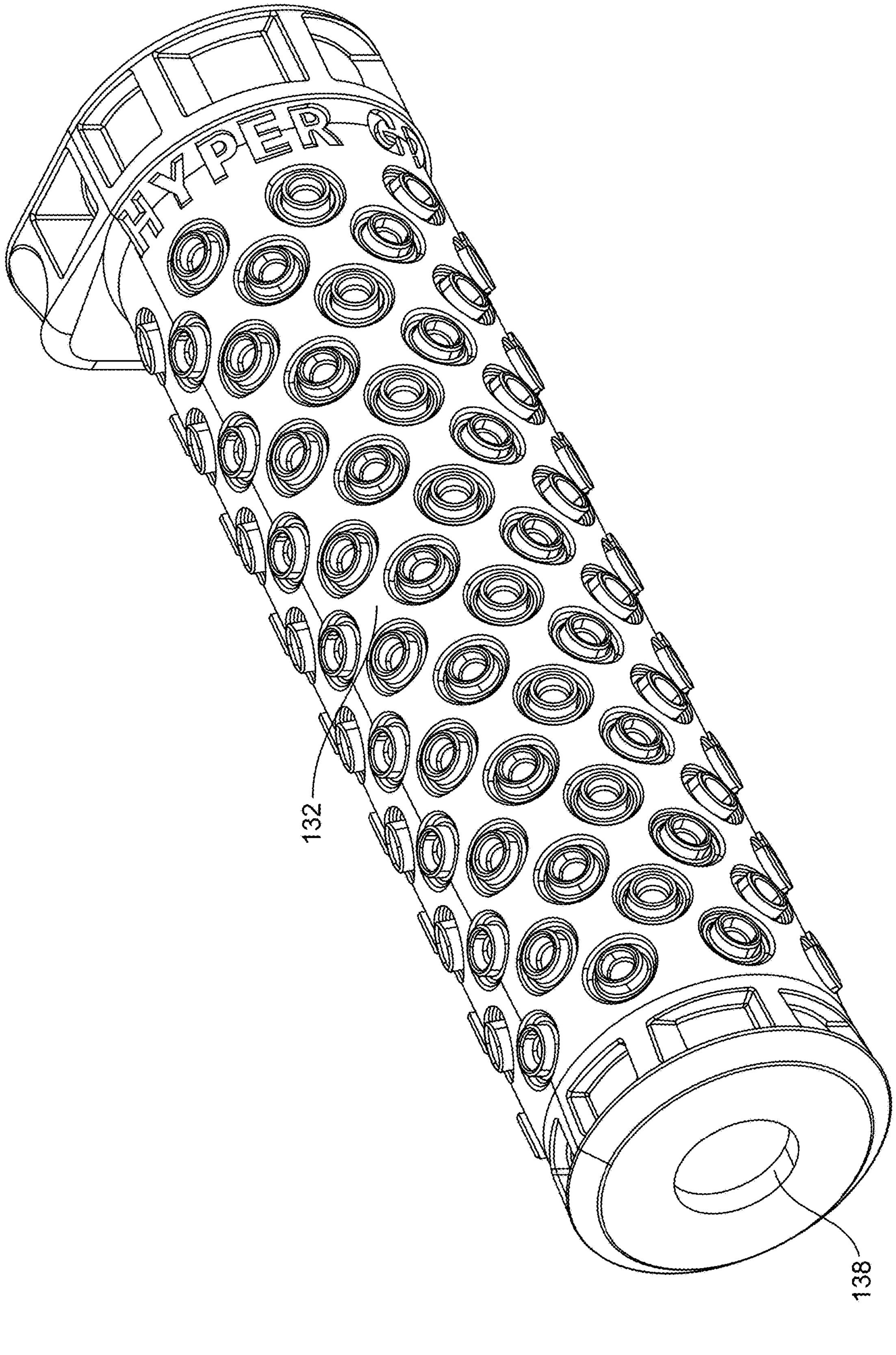
FIG. 6 illustrates a perspective view of a compression grip in accordance with embodiments of the invention.
Figure 7:
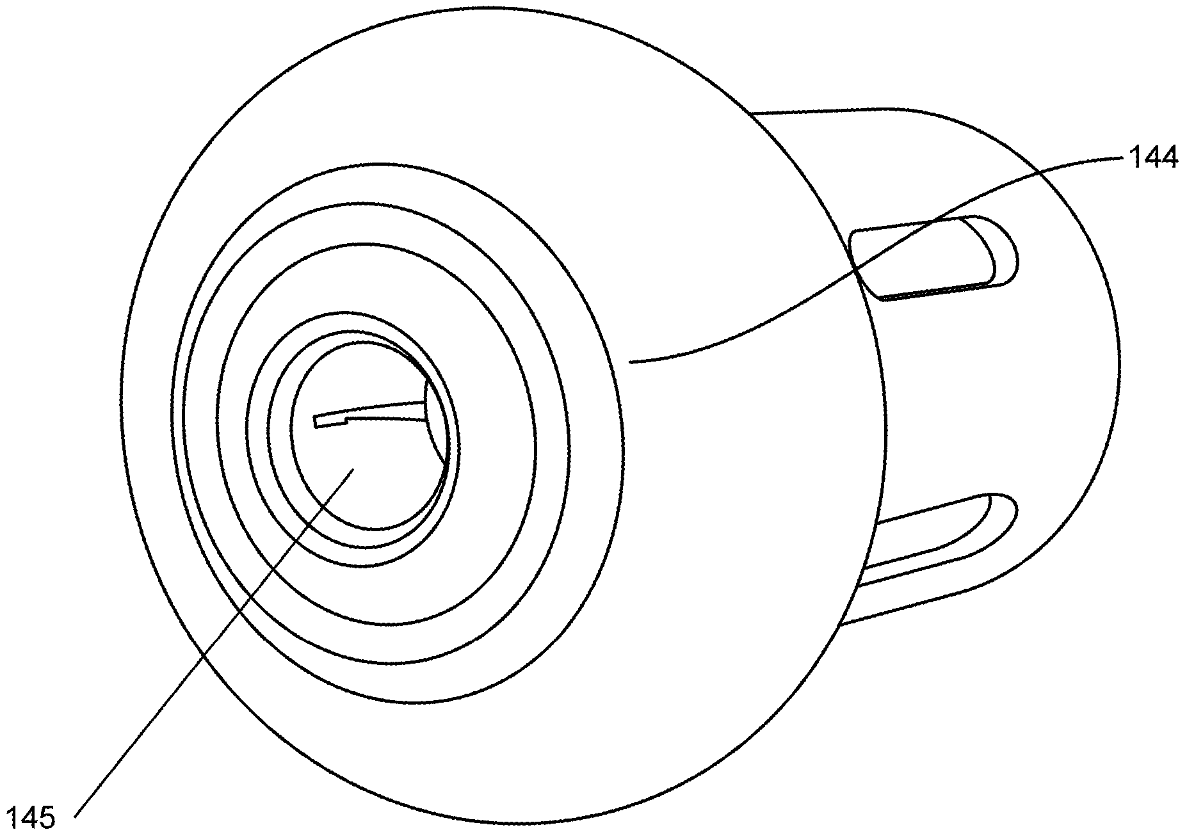
FIG. 7 illustrates a perspective view of a grip end in accordance with embodiments of the invention.

The images in the drawings are simplified for illustrative purposes and are not depicted to scale. Within the descriptions of the figures, similar elements are provided similar names and reference numerals as those of the previous figure(s). The specific numerals assigned to the elements are provided solely to aid in the description and are not meant to imply any limitations (structural or functional) on the invention.

The appended drawings illustrate exemplary configurations of the invention and, as such, should not be considered as limiting the scope of the invention that may admit to other equally effective configurations. It is contemplated that features of one configuration may be beneficially incorporated in other configurations without further recitation.

DETAILED DESCRIPTION

The embodiments of the disclosure will be best understood by reference to the drawings, wherein like parts are designated by like numerals throughout. It will be readily understood that the components, as generally described and illustrated in the Figures herein, could be arranged and designed in a wide variety of different configurations or be entirely separate. Thus, the following more detailed description of the embodiments of the system and method of the disclosure, as represented in the Figures is not intended to limit the scope of the disclosure, as claimed, but is merely representative of possible embodiments of the disclosure.

In accordance with embodiments of the invention, a quick draining pool tool 100 is provided, as illustrated in FIGS. 1-10. The tool 100 includes base tube 102 having a distal end 104 opposite a proximal end 106. The base tube 102 defines a drain 108. As illustrated in the figures, drain 108 may be eight slots with a 45-degree separation defined around the outer circumference of the base tube 102. The base tube 102 has a tool attachment connector 107 and is operable to receive and secure a tool at the proximal end 106 of the base tube 102. As illustrated in the figures, the base 102 is universally operable to receive any pool tool attachment via pool tool port 113. The base tube 102 may be fabricated of stainless steel, for example. A first stage tube 110 has a distal end 112 opposite a proximal end 114. In one embodiment, the first stage tube 110 is 29.2 mm 3K carbon fiber twill high strength hybrid with a gloss coating. The proximal end 114 of the first stage tube 110 is connected to the distal end 104 of the base tube 102. In one embodiment, the drain 108 and the tool attachment connector 107 are defined by the first stage tube 110, thereby eliminating the need for the base tube. A first compression clamp 116 is disposed at the distal end 112 of the first stage tube 110 and is operable to secure a second stage tube 118 disposed within the first stage tube 110. Bonding tape 111 may be disposed between the first compression clamp 116 and the first stage tube 110 to affix the first compression clamp 116 to the first stage tube 110. A second stage tube 118 is disposed within the first stage tube 110. In one embodiment, the second stage tube 118 is 26.1 mm 3K carbon fiber ribbed high strength hybrid carbon fiber with a matte finish coating. The second stage tube 118 has a distal end 120 opposite a proximal end 122. The second stage tube 118 is operable to slidably extend from the distal end 112 of the first stage tube and operable to be secured by the first compression clamp 116. A second compression clamp 124 is disposed at the distal end 120 of the second stage tube 118 and is operable to secure a third stage tube 126 disposed within the second stage tube 118. Bonding tape 111 may be disposed between the second compression clamp 124 and the second stage tube 118 to affix the second compression clamp 124 to the second stage tube 118. A third stage tube 126 is disposed within the second stage tube 118. In one embodiment, the third stage tube 126 is 22.6 mm 3K carbon fiber ribbed high strength hybrid carbon fiber with a matte finish coating. The third stage tube 126 has a distal end 128 opposite a proximal end 130. The third stage tube 126 is operable to slidably extend from the distal end 120 of the second stage tube 118. The third stage tube 126 is operable to be secured by the second compression clamp 124. A compression grip 132 is disposed at the distal end 128 of the third stage tube 126. The compression grip 132 has a distal end 134 opposite a proximal end 136. The compression grip 132 defines a vent 138 at the distal end 134. The vent 138 is operable to enable rapid draining of the pool tool 100. A tensioner 142 is disposed at the proximal end 136 of the compression grip 132 and is operable to secure the compression grip 132 to the third stage tube 126. A grip end 144, illustrated in FIG. 7, may be inserted into the proximal end of the compression grip 132. Grip end 144 may have an air vent 145.

In one embodiment, the first stage tube 110 and the second stage tube 118 overlap between 7 and 8 inches and the second stage tube 118 and third stage tube 126 overlap between 7 and 8 inches. This range in overlap increases strength of the tool 100 and avoids additional stress at the junctions between components. In one embodiment, the first compression clamp 116 and the second compression clamp 124 are thumb screw tension adjusters.

The tool 100 has multiple advantages over the prior art. Embodiments of the invention enable rapid air flow through flow path 140 by incorporating non migrating pinch style locking clamps 116 and 124 and an unobstructed flow path 140 through the interior of the tool 100. The base tube 102 is operable to allow water and air to easily enter and exit the tool 100, thereby significantly reducing the effects of friction, drag, and weight on the tool 100. In one embodiment, the inner diameter of the flow path 140 through the tool 100 is 12 mm.

In order to strengthen the tool 100, embodiments include hybrid carbon fiber inner tubes 118 and 126 with a 7 to 8 inch overlap and a 3K gloss carbon fiber twill outer tube 110. The gloss application is applied to prevent the carbon fiber from degrading. In one embodiment, perpendicular rapid lever action tube pinch clamps 116 and 124 are disposed between pole sections to eliminate the pole sections from getting stuck together while in use. Pinch clamps 116 and 124 provide multiple advantages over current style cam locks and threaded twist screw clamps, as these tend to develop great amounts of friction over time and eventually lock up during use requiring some form of hand tool to loosen the clamp only to have to clamping mechanism stick again and again until the mechanism either breaks or sticks to the point that the mechanism is inoperable. The pinch clamps 116 and 124 also prevent the tool 100 from completely collapsing while applying downward force. Conventional style cam locks can fail to retain full compression while articulating the pole, allowing the pole to collapse suddenly and without warning. Clamps 116 and 124 use a lever with a lobe to securely compress the clamp over the outside of the tube. This is a more reliable method of securing the pole sections together because articulating the pole has no effect on the method of compression used to secure the clamp. Perpendicular lever action pinch clamps are best suited to manipulate the pinch clamp to extend and collapse the tube sections.

Embodiments of the present invention are a significant improvement over conventional pool poles because the tool 100 allows greater volumes of air and water to quickly move in and out of a pool pole while reducing friction, drag, and weight which reduces fatigue on the pole and the user. By greatly reducing friction and drag on the pole, fatigue on the user is reduced while making the pole lighter, stronger and easier to adjust.

Figure 10:
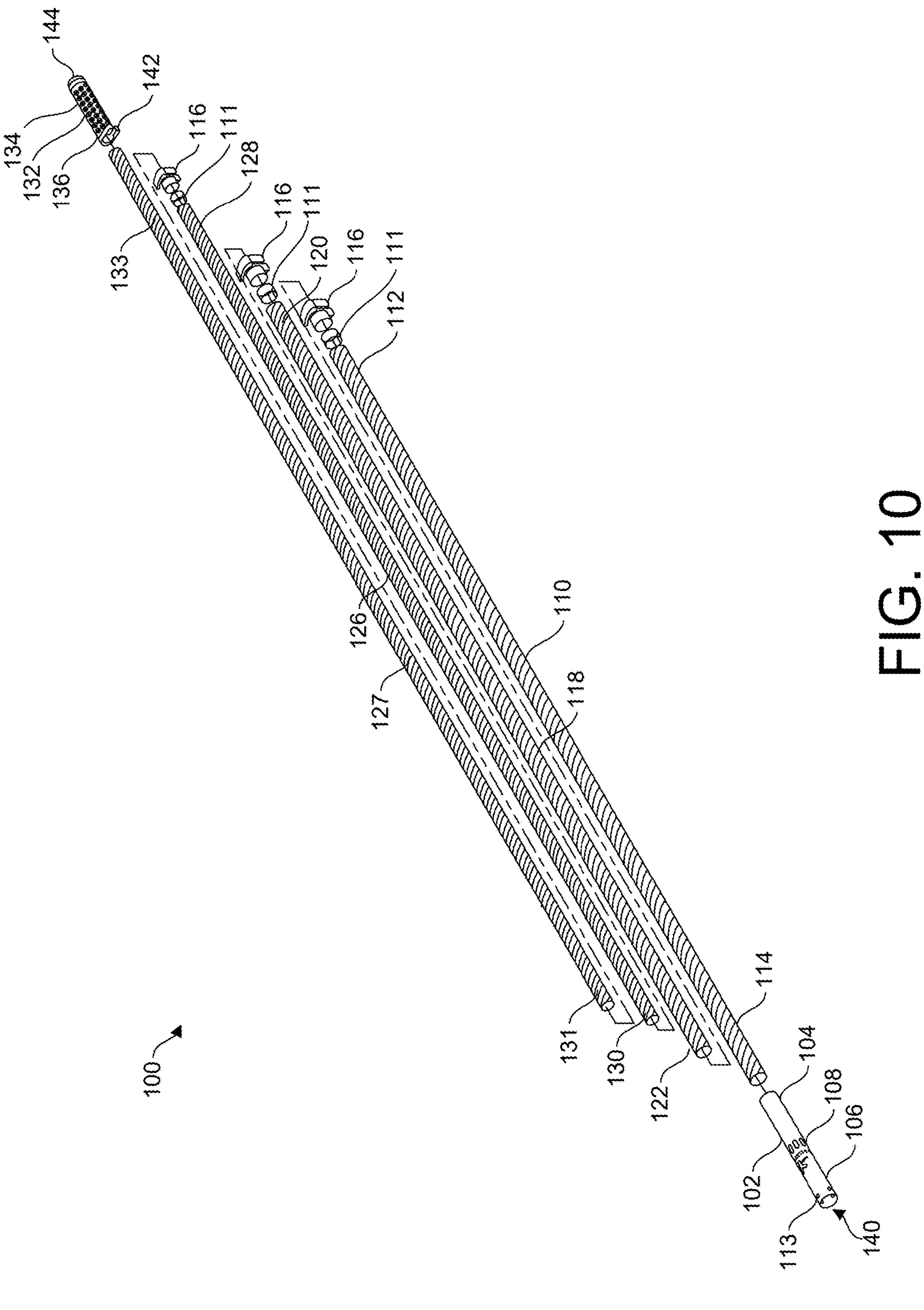
FIG. 10 illustrates an exploded perspective view of a pool tool in accordance with embodiments of the invention.

Some embodiments of the present invention may include one stage tube, two stage tubes, or three stage tubes or more, such as a fourth stage tube 127. FIG. 10 illustrates the fourth stage tube 127 having a proximal end 131 opposite a distal end 133. The fourth stage tube 127 is operable to slidably extend from the distal end 128 of the third stage tube 126. FIG. 1 illustrates two secondary stage tubes 118 and 126 operable to be disposed within the first stage tube 110. FIG. 10. illustrates three secondary stage tubes 118, 126, and 127 operable to be disposed within the first stage tube 110. For applications requiring a shorter length, such as for small pools, a fewer number of stage tubes may be included. For applications requiring a longer length, such as for large pools, a larger number of stage tubes may be included. The base tube 102 with incorporated tool end as well as non-obstructing compression tube clamps 116 and 124 and the nonslip compression grip 132 and large diameter air vent 138 enable rapid drain and of the tool 100 and reduce friction within the inner flow path 140.

The compression tube clamps 116 and 124 enable the user to quickly and securely choose a desired length along the second 118 and third stage 126 carbon fiber tubes from fully collapsed to fully expanded or any length combination in between by selecting a desired length and clamping the clamps 116 and 124. The perpendicular clamps 116 and 124 move in the direction of the hand as it opens and closes while holding a pole.

Figure 8:
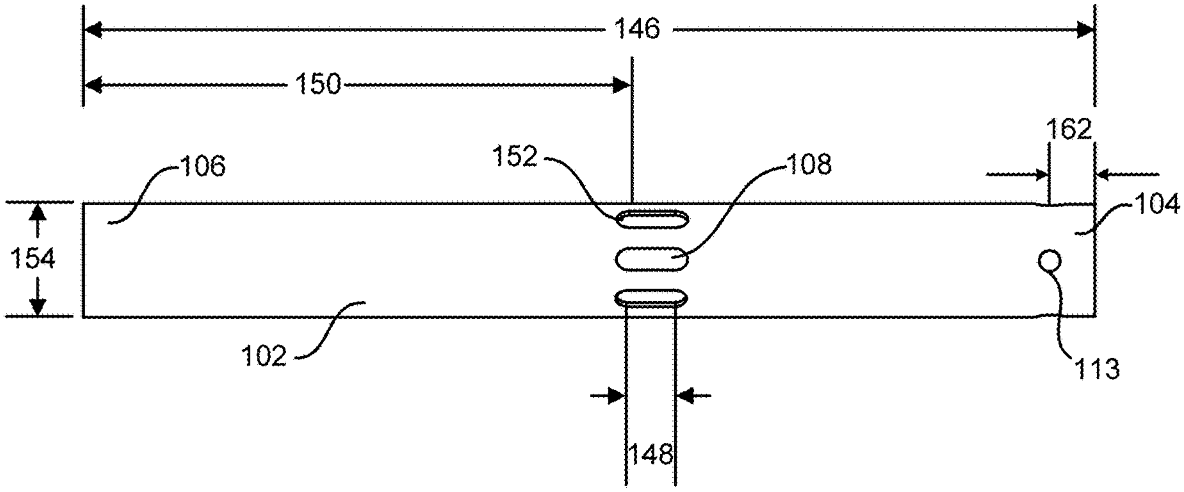
FIG. 8 illustrates a side view of a base tube in accordance with embodiments of the invention.
Figure 9:
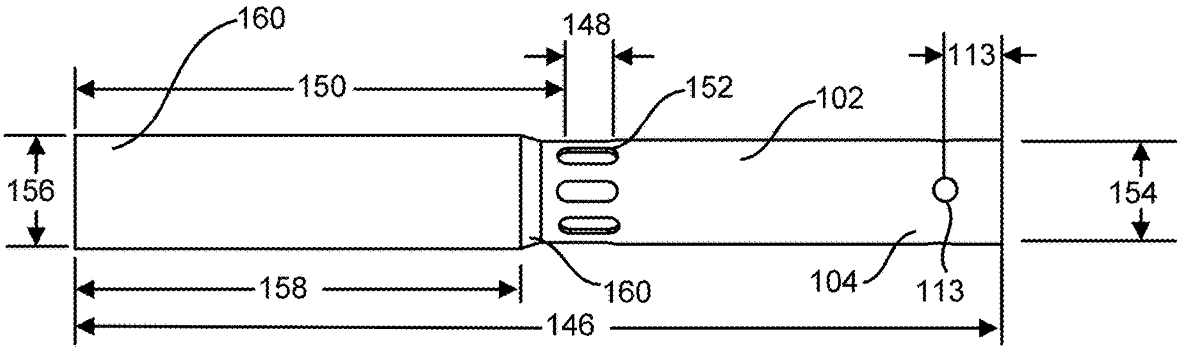
FIG. 9 illustrates a side view of a base tube in accordance with embodiments of the invention.

Referring to the embodiment illustrated in FIG. 8, the base tube has a length 146 and a diameter 154. In one embodiment, length 146 is 11.25 inches and diameter 154 is 1.25 inches. Drain length 148 is 0.46 inches. The drain 108 is positioned a distance 150 from the proximal end of the base tube 106. In one embodiment, the distance 150 is 6.09 inches. The drain has a radius 152, which may be 0.11 inches, for example. The tool port 113 may be positioned a distance 162 from the distal end 104 of the base tube 102. In one embodiment, the tool port attachment 113 has a diameter of 0.25 inches and distance 162 is 0.5 inches. The base tube 102 may be 18 gauge (0.05") 304 stainless steel, for example. Referring to FIG. 9, the base tube 102 may be adapted to receive a first stage tube 110 with a larger diameter 156 relative to diameter 154. In one embodiment, diameter 156 is 1.4 inches. A taper is positioned a distance 158 from the proximal end 104 of the base tube 102. In one embodiment, the distance 158 is 5.5 inches.

An exemplary calculation for the flow rate of the drain 108 is provided. Referring to the embodiment of the base tube 102 as illustrated in FIG. 8, an exemplary set of dimensions is: distance 150 is 6.09 inches, drain length 148 is 0.46 inches, drain radius 152 is 0.11 inches, distance 162 is 0.5 inches, length 146 is 11.25 inches, and diameter 154 is 1.25 inches. As illustrated in FIG. 8, drain 108 is 8 slots with a 45 degree separation. In the calculations illustrated in the tables below, the flow rate of the air into the vent 145 is at least as much as the flow rate of the water exiting the drain 108. In this embodiment, each slot of the drain 108 is operable for draining 0.0537 gallons per minute, enabling the drain 108 to drain the tool 100 at 0.43 gallons per minute, thereby enabling the tool 100 to drain rapidly. An exemplary length of the assembled pool tool 100 is 8 feet as included in the calculation below. In one embodiment, the assembled pool tool 100 is 13 feet extended and 60 inches collapsed. In one embodiment, the assembled pool tool 100 is 15 feet extended and 61.5 inches collapsed. In one embodiment, the assembled pool tool 100 is 17 feet extended and 83.25 inches collapsed. In one embodiment, the assembled pool tool 100 is 20 feet extended and 96 inches collapsed.

TABLE 1

| Stage Pole Lengths. | | | | |
|---|---|---|---|---|
| Tool 100 Length (Feet) | First Stage Tube 110 Length (inches) | Second Stage Tube 118 Length (inches) | Third Stage Tube 126 Length (inches) | Fourth Stage Tube 127 Length (inches) |
| 13 | 50.75 | 52.25 | 58.125 | none |
| 15 | 58.25 | 59.75 | 65.625 | none |
| 16 | 94 | 99.75 | none | none |
| 17 | 68.5 | 70.0 | 75.875 | none |
| 20 | 81.75 | 83.25 | 89.125 | none |
| 26 | 80.25 | 81.75 | 83.25 | 89.125 |

TABLE 2

| Calculation for water in and out of drain 108. | |
|---|---|
| Area per slot | $A_{slot}$ = .139 $in^2$ = .00096 $ft^2$ |
| Perimeter per slot | $P_{slot}$ = 1.611 $in^2$ = .134 $ft^2$ |
| The hydraulic diameter is | $D_h$ = 4A/P<br>$D_{h\ slot}$ = .345 in = .02875 ft |
| Inside diameter of the tube | $D_{h\ tube}$ = 1.15 in = .0958 ft |
| Inside area of tube | $A_{tube}$ = 1.038 $in^2$ = .0072 $ft^2$ |
| Length of tube | L = 96 in = 8 ft |
| Average length of tube | $L_{tube}$ = 48 in = 4 ft |
| Volume of water | $Vol_{H2O}$ = 99.648 $in^3$ = .0577 $ft^3$ = .43 gallon |
| Volume of water through each orifice | $Vol_{orifice}$ = 124.56 $in^3$ = .0072 $ft^3$ = .0537 gal |
| Average head height of H2O | $H_{tube}$ = 4 ft wg (4 ft of water pressure ½ height of tube) |

An exemplary diameter of the air vent 145 is 0.375 inches (0.312 feet). The volume of water displaced through the drain 108 is equal volume of air into the air vent 145. A change in head pressure creates a pressure differential to bring air into the system. If the air vent 145 is too small, the pressure drop of the incoming air will limit the water flowing out the drain 108.

To calculate the total pressure drop in the tool 100 for water flowing out of the drain 108, the equation in Table 3 is utilized. The process to solve the equation in Table 3 is solved iteratively as illustrated in Table 4.

TABLE 3

Total Pressure Drop $H_{tube}$ for Water Flowing Out of Drain 108.

$H_{tube} = dP_{orifice} + dP_{90\ bend} + dP_{pipe\ length}$

Q = Orifice Capacity in gallons per minute (gpm)

$$Q = Cd * \left(\frac{do}{.183}\right)^2 * \sqrt{\frac{dP}{SG}}$$

TABLE 3-continued

Total Pressure Drop $H_{tube}$ for Water Flowing Out of Drain 108.

Drag Coefficient (Cd) = .7

Do in orifice diameter = $D_{h\ slot}$ = .345 in dP psi assume H = 3 ft wg rest is lost in pipe and elbow friction so dP = 1.3 psi SG = 1.0 specific gravity Orifice capacity is Q = 2.83 gpm = .047 gal/sec = .0063 $ft^3$/s Each orifice has a total volume throughput of .0537 gal So time for total water volume to go through orifice is .0537/.047 t = 1.14 sec

Flow rate of the water in the tube is .0577 $ft^3$ / 1.14 sec $Q_{H2O\ tube}$ = .0506 $ft^3$/s Velocity = Q/A = .0506 $ft^3$/s/.0072 $ft^2$ = 7 ft/sec Pressure drop in pipe and 90 bend $$Re = \frac{\rho VDh}{\mu}$$

ρ = 1.93 slugs/$ft^3$

V = 7 ft/s $D_h$ = .0958 ft

μ = $1.77\times10^{-5}$ lb-s/$ft^2$

Re = 73,121 turbulent $$f = .0056 + \frac{.5}{Re^{.32}}$$

f = .0195

K = .5 (elbow) + fL/$D_h$ = .5 + .0195 * 48 / 1.15

K = 1.314

Head Loss

H = K $V^2$/(2g) = 1.314 * $7^2$ /(2*32.174)

H = 1 ft wg

So Total Pressure drop from water running out is $H_{total}$ = dP orifice + dP pipe & 90 elbow = 3 ft wg + 1 ft wg = 4 ft wg Velocity of water running out is V = 7 ft/s Volume flow rate water running out is Q = .0506 $ft^3$/sec

TABLE 4

Calculation to Confirm the Airflow through Vent 145 is less than 4 ft wg.

Check airflow through vent 145 at Q=.0506 $ft^3$/s and verify head pressure is less than 4 ft wg Airflow through orifice $$Q = 1360/60 * Cd * \left(\frac{do}{.183}\right)^2 * p1 + \left(1 - \frac{\frac{p1-p2}{p1}}{3Fx}\right)\sqrt{\frac{\frac{p1-p2}{p1}}{T+459.67}}$$

Q SCFM = .0506 $ft^3$/s (use SCFM = ACFM as there is little difference in pressure or temperature from standard and error will be minimal)

Cd = .7

$d_o$ = .375 in

TABLE 4-continued

| Calculation to Confirm the Airflow through Vent 145 is less than 4 ft wg. |
|---|
| p2 = 14.69 psia<br>F = 1<br>X = .72<br>T = 80F<br>Solve for<br>p1 = 14.766 psia = .175 ft wg<br>Loss in tube<br>$Q = .0506\ ft^3/s$<br>$A = .0072\ ft^2$<br>V = Q/A = 7 Ft/s<br>$Re = \frac{\rho V D h}{\mu}$<br>$\rho_{air} = .00228\ slugs/ft^3$<br>V = 7 ft/s<br>$D_h = .0958$ ft<br>$\mu_{air} = 3.85 \times 10^{-7}$ lb-s/ft$^2$<br>Re = 3971 turbulent<br>$f = .0056 + \frac{.5}{Re^{.32}}$<br>$f = .0408$<br>$K = fL/D_h = .0408*48/.375$<br>K = 5.2<br>Head Loss<br>$H = K\ V^2/(2g) = 5.2*\ 7^2\ /(2*32.174)$<br>H = 3.95 ft wg<br>Total Head = dP vent = dP tube = .175 + 3.95 = 4.13 ft wg<br>The pressure drop of the incoming air is almost equivalent to the pressure drop of the water falling out. The difference is within the margin of error of the calculations. |

For the purposes of promoting an understanding of the principles of the invention, reference has been made to the preferred embodiments illustrated in the drawings, and specific language has been used to describe these embodiments. However, this specific language intends no limitation of the scope of the invention, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional aspects of the system (and components of the individual operating components of the system) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

The invention claimed is:

1. A rapid draining pool tool end, comprising:

a base tube having a distal end opposite a proximal end, said distal end of said base tube having a diameter larger than a diameter of said proximal end of said base tube;

a taper;

a drain defined by said proximal portion of said base tube, said drain comprising a plurality of pairs of holes equally spaced around a circumference of said base tube;

wherein said distal end of said base tube is operable to receive and secure a proximal end of a tube of a pool tool; and wherein said drain is operable to enable rapid draining of a pool tool.

2. The rapid draining pool tool end of claim 1, wherein said drain drains water from a pool tool in an amount equal to an amount of air entering a pool tool.

3. The rapid draining pool tool end of claim 1, wherein said drain comprises at least eight holes spaced around a circumference of said base tube.

4. The rapid draining pool tool end of claim 3, wherein said eight holes are positioned in a 45-degree separation defined around a circumference of said base tube.

5. The rapid draining pool tool end of claim 1, further comprising a tool attachment port.

6. The rapid draining pool tool end of claim 1, wherein said drain comprises at least four holes spaced around a circumference of said base tube.

7. The rapid draining pool tool end of claim 1, wherein said drain comprises at least three holes spaced around a circumference of said base tube.

8. A rapid draining pool tool end, comprising:

a base tube having a distal end opposite a proximal end, said distal end of said base tube having a diameter larger than a diameter of said proximal end of said base tube;

a taper;

a drain defined by said proximal portion of said base tube, said drain comprising at least four apertures spaced around a circumference of said base tube;

wherein said distal end of said base tube is operable to receive and secure a proximal end of a tube of a pool tool; and wherein said drain is operable to enable rapid draining of a pool tool.

9. The rapid draining pool tool end of claim 8, wherein said at least four apertures are equally spaced around said circumference of said base tube.

10. The rapid draining pool tool end of claim 8, wherein said drain comprises at least eight apertures are equally spaced around said circumference of said base tube.

11. The rapid draining pool tool end of claim 8, wherein said drain drains water from a pool tool in an amount equal to an amount of air entering a pool tool.

12. The rapid draining pool tool end of claim 8, further comprising a tool attachment port.

13. The rapid draining pool tool end of claim 8, wherein said at least three apertures are equally spaced around said circumference of said base tube.

14. A rapid draining pool tool end, comprising:

a base tube having a distal end opposite a proximal end of said base tube having a diameter larger than a diameter of said proximal end of said base tube;

a taper;

a drain defined by said proximal portion of said base tube, said drain comprising a plurality of slots spaced around a circumference of said base tube;

wherein said distal end of said base tube is operable to receive and secure a proximal end of a tube of a pool tool; and wherein said drain is operable to enable rapid draining of a pool tool.

15. The rapid draining pool tool end of claim 14, wherein said plurality of slots are equally spaced around said circumference of said base tube.

16. The rapid draining pool tool end of claim 14, wherein said drain comprises at least four slots.

17. The rapid draining pool tool end of claim 14, wherein said drain comprises at least eight slots.

18. The rapid draining pool tool end of claim 14, wherein said drain drains water from a pool tool in an amount equal to an amount of air entering a pool tool.

19. The rapid draining pool tool end of claim 14, further comprising a tool attachment port.

20. The rapid draining pool tool end of claim 14, wherein said drain comprises at least three slots.

21. A rapid draining pool tool end, comprising:

a base tube having a first end opposite a second end, said first end of said base tube having a diameter larger than a diameter of said second end of said base tube;

a taper;

a drain defined by said base tube, said drain comprising a plurality of openings spaced around a circumference of said base tube;

wherein said base tube is operable to receive and secure a tube of a pool tool; and wherein said drain is operable to enable rapid draining of a pool tool.

22. The rapid draining pool tool end of claim 21, wherein said openings are holes, slots, or apertures.

23. The rapid draining pool tool end of claim 21, wherein said drain comprises at least three holes, slots, or apertures.

24. The rapid draining pool tool end of claim 21, wherein said drain comprises at least four holes, slots, or apertures.

25. The rapid draining pool tool end of claim 21, wherein said drain comprises at least eight holes, slots, or apertures.

26. The rapid draining pool tool end of claim 21, wherein said plurality of openings are equally spaced around a circumference of said base tube.

27. The rapid draining pool tool end of claim 21, wherein said drain drains water from a pool tool in an amount equal to an amount of air entering a pool tool.

28. The rapid draining pool tool end of claim 21, wherein said drain drains water from a pool tool in an amount at least as much as an amount of air entering a pool tool.

29. The rapid draining pool tool end of claim 21, further comprising a tool attachment port.

* * * * *